United States Patent [19]

Hirzel et al.

[11] E Patent Number: Re. 33,486

[45] Reissued Date of Patent: Dec. 11, 1990

[54] SELECTIVE DECELERATION BRAKE CONTROL SYSTEM

[75] Inventors: Edgar A. Hirzel, Granada Hills; Robert D. Cook, Valencia, both of Calif.

[73] Assignee: Hydro-Aire Div. of Crane Company, Burbank, Calif.

[21] Appl. No.: 22,488

[22] Filed: Mar. 5, 1987

Related U.S. Patent Documents

Reissue of:

[64] Patent No.: 4,022,513
Issued: May 10, 1977
Appl. No.: 243,251
Filed: Apr. 12, 1972

U.S. Applications:

[63] Continuation of Ser. No. 488,525, Apr. 28, 1983, abandoned, which is a continuation of Ser. No. 119,381, Feb. 7, 1980, abandoned.

[51] Int. Cl.[5] ..... B60T 8/02

[52] U.S. Cl. ..... 364/426.02; 303/93; 303/109; 244/111

[58] Field of Search ..... 364/424, 426, 424.02, 364/424.01; 188/181 A, 181 C; 244/110 A, 111; 303/20, 93, 106, 109, 100, DIG. 3, DIG. 4, 6 A, 33

[56] References Cited

U.S. PATENT DOCUMENTS

| | | | |
|---|---|---|---|
| 3,105,179 | 9/1963 | Young et al. | 318/6 |
| 3,235,751 | 2/1966 | Callan | 307/88.5 |
| 3,350,612 | 10/1967 | Hansen et al. | 318/143 |
| 3,503,654 | 3/1970 | Stamm | 303/96 |
| 3,520,575 | 7/1970 | Steigerwald | 303/93 |
| 3,537,758 | 11/1970 | Buhler et al. | 303/20 |
| 3,543,113 | 11/1970 | Miller | 318/142 |
| 3,543,121 | 11/1970 | Miller | 318/393 |
| 3,545,817 | 12/1970 | Yarber | 303/93 |
| 3,554,612 | 1/1971 | Harned | 303/107 |
| 3,574,415 | 4/1971 | Stamm | 303/96 |
| 3,574,417 | 4/1971 | Howard et al. | 303/21 |
| 3,578,819 | 5/1971 | Atkins | 303/21 |
| 3,587,798 | 6/1971 | Schuman | 192/12 |
| 3,602,553 | 8/1971 | Cumming et al. | 188/181 C X |
| 3,603,856 | 9/1971 | Zalar | 318/231 |
| 3,604,760 | 9/1971 | Atkins | 188/181.1 A X |
| 3,608,978 | 9/1971 | Neisch | 303/20 X |
| 3,614,174 | 10/1971 | Romero | 244/111 X |
| 3,620,577 | 11/1971 | Neisch et al. | 303/20 X |
| 3,658,388 | 4/1972 | Hasegawa | 303/109 |
| 3,664,713 | 5/1972 | Riordan et al. | 303/DIG. 4 |
| 3,682,512 | 8/1972 | Malon et al. | 303/93 X |
| 3,711,163 | 1/1973 | Booher | 303/21 P |
| 3,819,004 | 6/1974 | Adde | 303/20 X |
| 3,850,480 | 11/1974 | Atkins | 303/106 X |
| 4,094,556 | 6/1978 | Okamoto et al. | 303/109 |

FOREIGN PATENT DOCUMENTS

| | | | |
|---|---|---|---|
| 1810163 | 7/1970 | Fed. Rep. of Germany | 303/106 |

*Primary Examiner*—Parshotam S. Lall
*Assistant Examiner*—Joseph L. Dixon
*Attorney, Agent, or Firm*—Fulwider, Patton, Lee & Utecht

[57] ABSTRACT

A selective deceleration brake control system which enables the operator of an aircraft or other vehicle to preselect a rate of deceleration for the vehicle. The system produces a velocity reference signal which decreases in value at a rate indicative of the rate of vehicle deceleration selected by the operator. A signal indicative of actual wheel velocity is continuously produced and compared with the velocity reference signal to generate an error signal. The error signal is processed and used to produce a brake control signal. The system continuously controls braking effort to cause the vehicle to decelerate at the rate selected by the operator. The selective deceleration circuit cooperates with an anti-skid brake control circuit such that at any instant the circuit providing the higher brake release command will control.

44 Claims, 7 Drawing Sheets

SELECTIVE DECELERATION BRAKE CONTROL SYSTEM

Matter enclosed in heavy brackets [ ] appears in the original patent but forms no part of this reissue specification; matter printed in italics indicates the additions made by reissue.

*This is a continuation of application Ser. No. 488,525, filed 4/28/83 which is a combination of application Ser. No. 119,381, filed Feb. 7, 1980 now both abandoned.*

BACKGROUND OF THE INVENTION

The present invention relates to a deceleration control system for a vehicle and, more particularly, to a selective deceleration brake control system which is effective to control braking effort to cause the vehicle to decelerate at a rate selected and set by the operator.

It has been the general practice to provide anti-skid brake control systems on commercial aircraft to aid the aircraft in its deceleration after land. Anti-skid systems have reached a point of development beyond merely detecting and terminating wheel skids. A modern anti-skid system functions to optimize braking efficiency by continuously adapting to changing runway conditions and other factors affecting braking to provide maximum braking effort consistent with the level of brake pressure selected by pilot brake pedal control. Such an anti-skid system is disclosed in U.S. patent application Ser. No. 155,903, filed June 23, 1971, entitled Brake Control System, which issued as U.S. Pat. No. 3,768,873 on Oct. 30, 1973, and in U.S. Pat. No. 3,724,916, issued Apr. 3, 1973, and U.S. Pat. No. 3,729,234, issued Apr. 24, 1973. Despite the development of superior anti-skid brake control systems, however, it remained necessary for the pilot to continuously adjust the level of brake pressure by manual brake pedal manipulation in order to accomplish a smooth and comfortable deceleration of the aircraft. The present invention relieves the pilot of this burden of constant attention to brake pedal adjustment while providing a smooth comfortable deceleration of the aircraft by automatically controlling brake pressure to cause the aircraft to decelerate at a rate preselected by the pilot.

SUMMARY OF THE INVENTION

As indicated, the general purpose of this invention is to provide a selective deceleration system for decelerating a vehicle at a preselected rate of deceleration. Briefly, the selective deceleration system comprises analog means, including a transducer, for generating an electrical analog signal indicative of the velocity of the wheel or wheels being controlled by the system. A reference generating means is provided for generating a reference velocity signal having a preselectable rate of decrease or rundown. A comparator means continuously compares the wheel velocity analog signal with the reference velocity signal to provide an error signal indicative of the difference between the wheel velocity signal and the reference velocity signal. The error signal is submitted to a modulation circuit which generates a modulation signal which is a time integral function of the error signal. The modulation signal and the error signal itself are continuously summed to form a composite deceleration brake control signal for transmission to the valve driver associated with the wheel or wheels which are being controlled. The brake pressure level applied is a proportional function of the deceleration control signal, and in this way, braking is controlled to cause the vehicle to decelerate in accordance with the preselected rate of deceleration chosen by the operator of the vehicle.

To insure a smooth initial application of brakes by the selective deceleration system following wheel spinup, the system includes an ON-ramp circuit which provides an initial gradual increase of brake pressure following wheel spin-up. Similarly, an OFF-ramp circuit is included to provide a gradual decrease of brake pressure when the selective deceleration control system is deactuated.

The complete brake control system for the vehicle preferably includes an anti-skid system operation in conjunction with the selected deceleration control system. In this circumstance, the deceleration brake control signal is not transmitted directly to the valve driver, but instead is continuously compared to an anti-skid brake control signal transmitted from the output of the anti-skid system. If at any time the anti-skid control signal would provide a lower braking pressure than the selective deceleration control signal, the anti-skid signal will be applied to the valve driver instead of the selective deceleration control signal. However, if the selective deceleration control signal would provide a lower braking pressure, then it will be transmitted to the valve driver. By utilizing the selective deceleration control circuit in combination with an anti-skid control circuit in this manner, greater safety is obtained. For example, if the operator of the aircraft were to select a deceleration rate of 12 feet per second per second, and the runway were extremely wet, be may be unable to develop a ground coefficient of friction between the tire and runway sufficient to obtain a deceleration rate of 12 feet per second per second. As the tire began to skid, the selected deceleration control circuit would continue to operate. However, the braking control for the wheel would instead be provided by the anti-skid control system. The anti-skid system would continue to control the braking of the aircraft until the ground coefficient necessary to give a deceleration of 12 feet per second per second without skidding is again available. As an additional safety feature, the pilot is given the option of immediately discontinuing the use of the selected deceleration control circuit. He may either throw a switch in the cockpit or may apply manually controlled braking by touching his brake pedals. In either case, the selective deceleration control circuit will be cut out and only the anti-skid circuit would be effective to modify braking of the aircraft.

A single selected deceleration control circuit may be used to control the deceleration braking of a single wheel or of a group of wheels. For example, in the embodiment described in the following detailed description, one selective deceleration circuit controls a pair of symmetrically positioned inboard wheels of an aircraft and a second selective deceleration circuit controls a pair of symmetrically positioned outboard wheels. In such arrangements, a common rate selector is used to select a single deceleration rate for both deceleration control circuits, and a pressure balancing circuit is preferably provided to equalize the brake load distribution between the two wheel pairs or groups controlled by the separate selective deceleration circuits.

The foregoing features and objects and many of the attendent advantages of this invention will be more readily appreciated by reference to the following detailed description when considered in connection with the accompanying drawings wherein like reference characters designate like or corresponding parts throughout the several views.

DESCRIPTION OF THE PREFERRED EMBODIMENT

Figure 1:
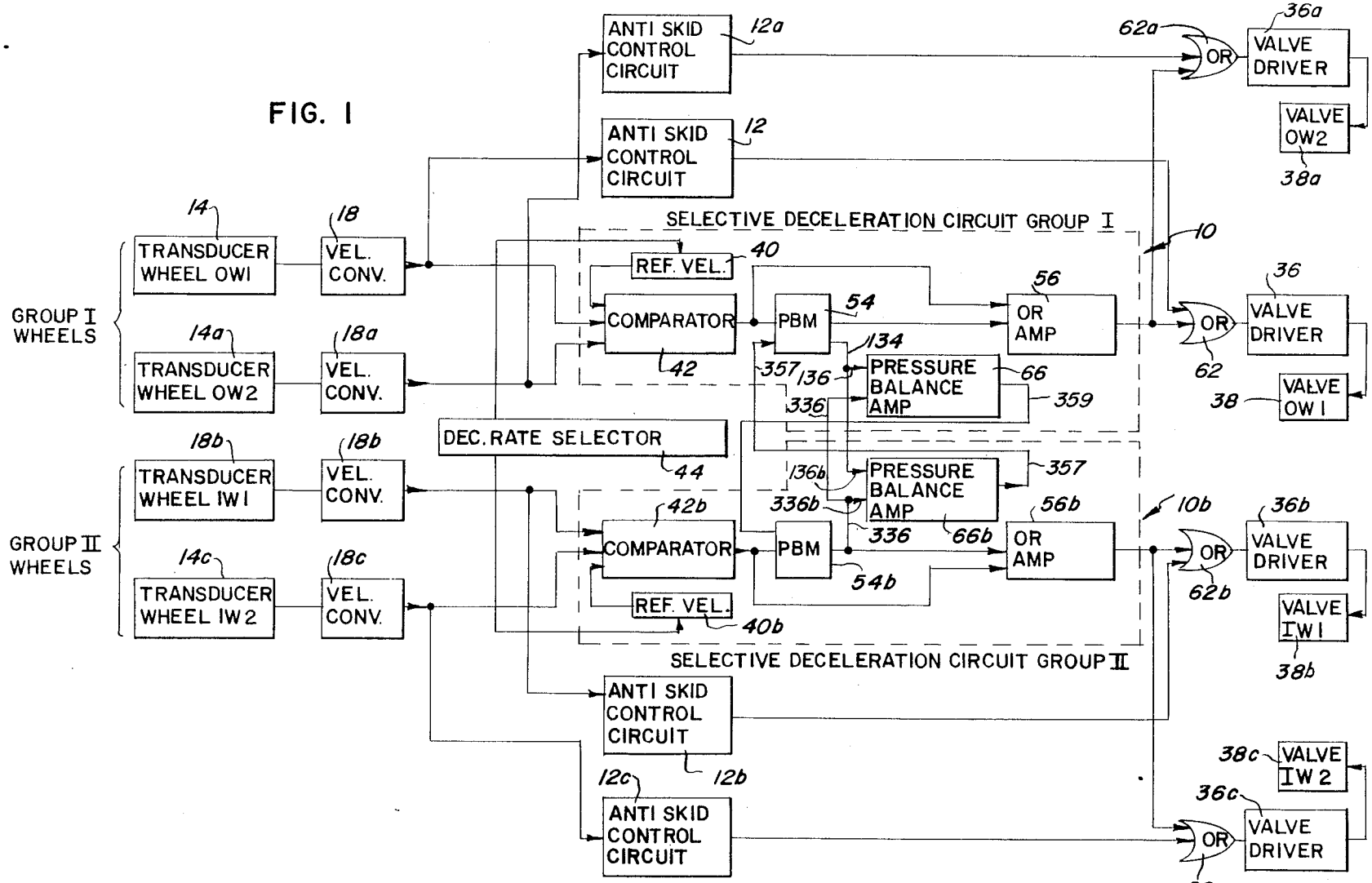
FIG. 1 is a functional block diagram of an exemplary aircraft brake control system embodying a preferred form of the invention.

Referring now to the drawing wherein like reference numerals designate like or corresponding parts throughout the several views, a preferred embodiment of the invention is illustrated as used in an exemplary brake control system for an aircraft having four braked wheels. One selective deceleration control circuit 10 is used to control a pair of outboard wheels OW1 and OW2 symmetrically mounted on opposite sides of the aircraft. The outboard wheels OW1 and OW2 are collectively referred to in FIGS. 1 and 2 as the Group I wheels. A second selective deceleration control circuit 10b is used to control a pair of inboard wheels IW1 and IW2 also symmetrically mounted on opposite sides of the aircraft. The inboard wheels IW1 and IW2 are collectively referred to herein as the Group II wheels. In application to aircraft having a greater or lesser number of braked wheels, the number of wheels included in each group controlled by one selective deceleration circuit and the number of such groups and associated selective deceleration control circuits will vary in accordance with the requirements of the particular aircraft. In some applications, it may be found desirable to provide a selective deceleration control circuit for each wheel.

Although the selective deceleration control system could be utilized without associated anti-skid circuitry, a more effective and safer braking system is provided by using the selective deceleration control circuit in conjunction with an anti-skid system such as that described in the aforementioned Hirzel U.S. patent application Ser. No. 155,903.

Figure 3:
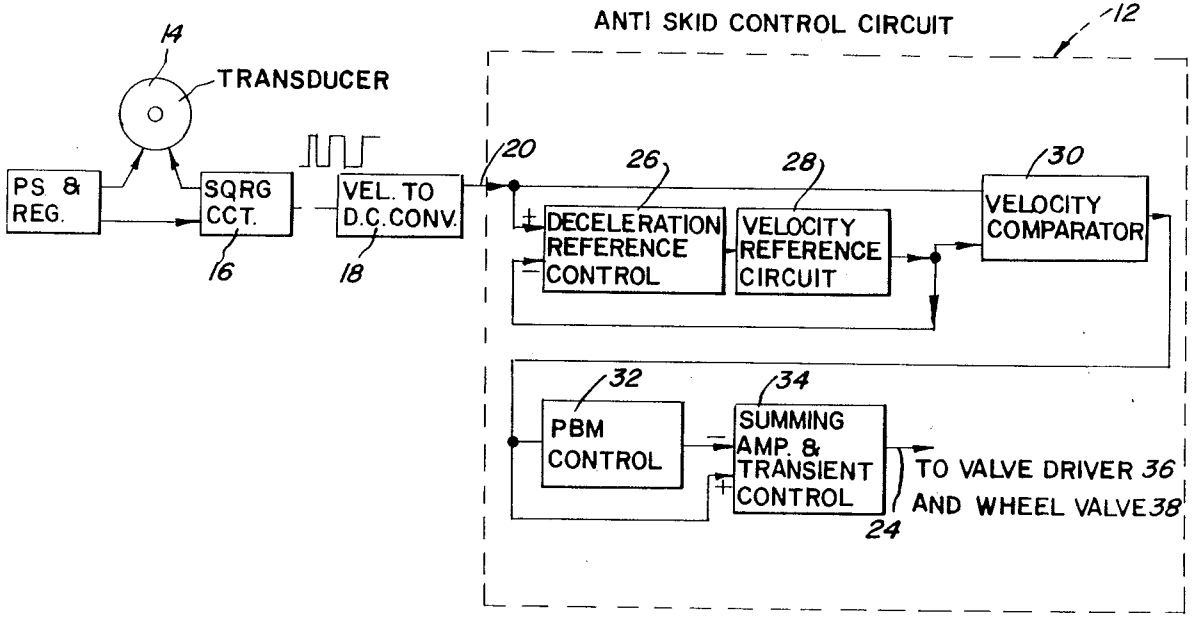
FIG. 3 is a functional block diagram of an anti-skid control circuit which may be utilized in conjunction with the selective deceleration control circuit as shown in FIG. 1.
Figure 4A:
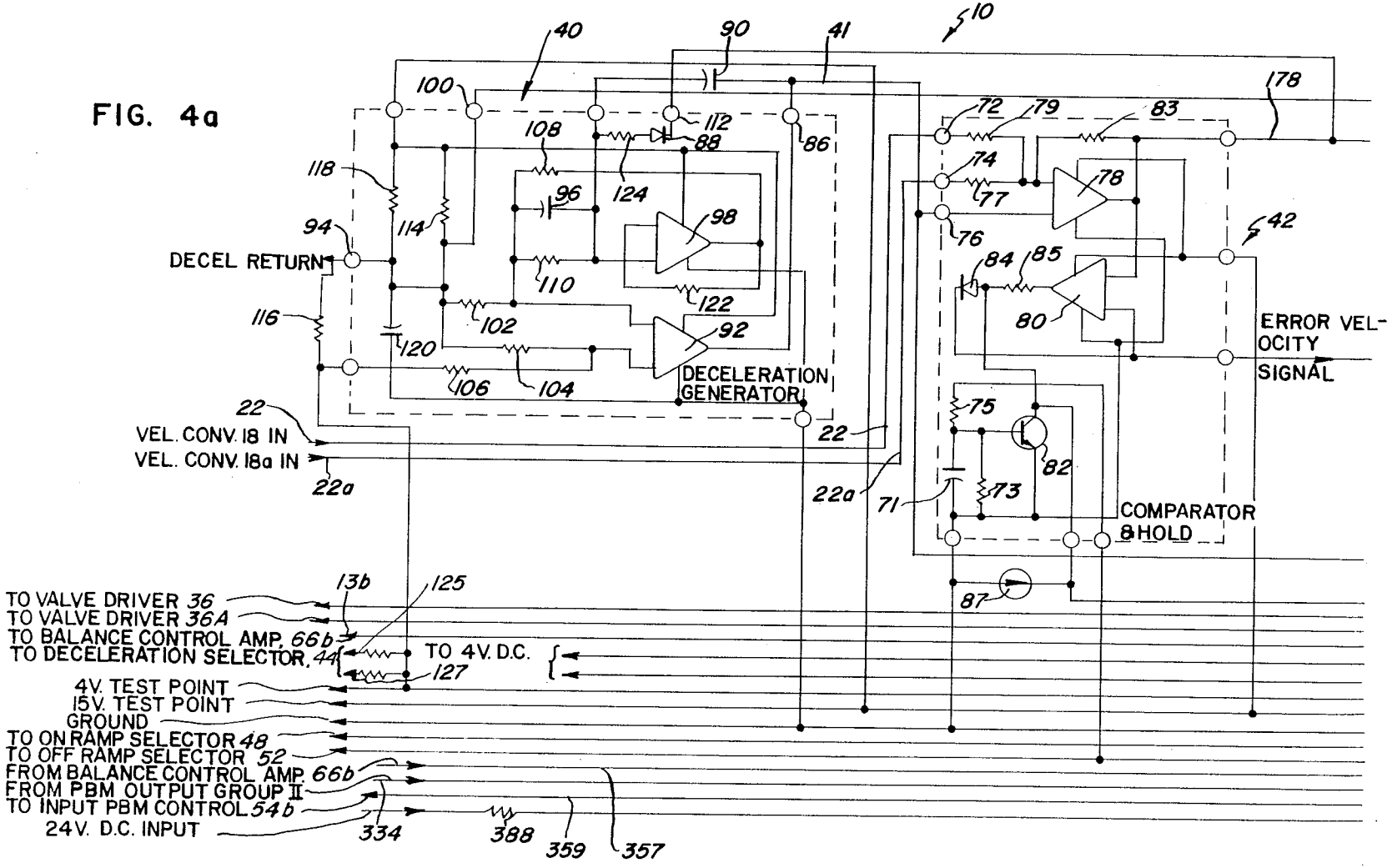
FIGS. 4a, 4b, 4c, and 4d collectively depict in block and schematic diagram form the circuit details of the selective deceleration control circuit shown in FIG. 1.
Figure 4B:
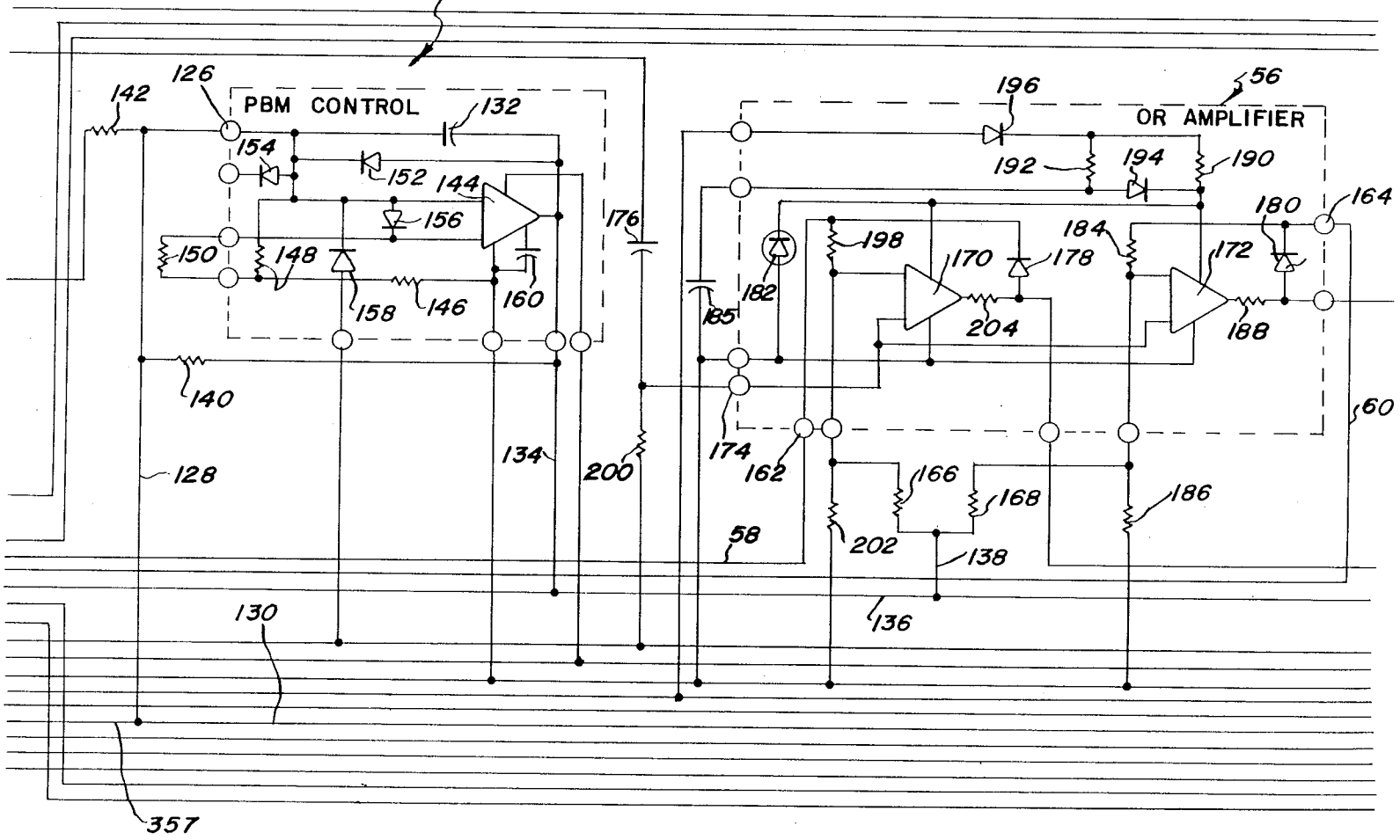
Figure 4C:
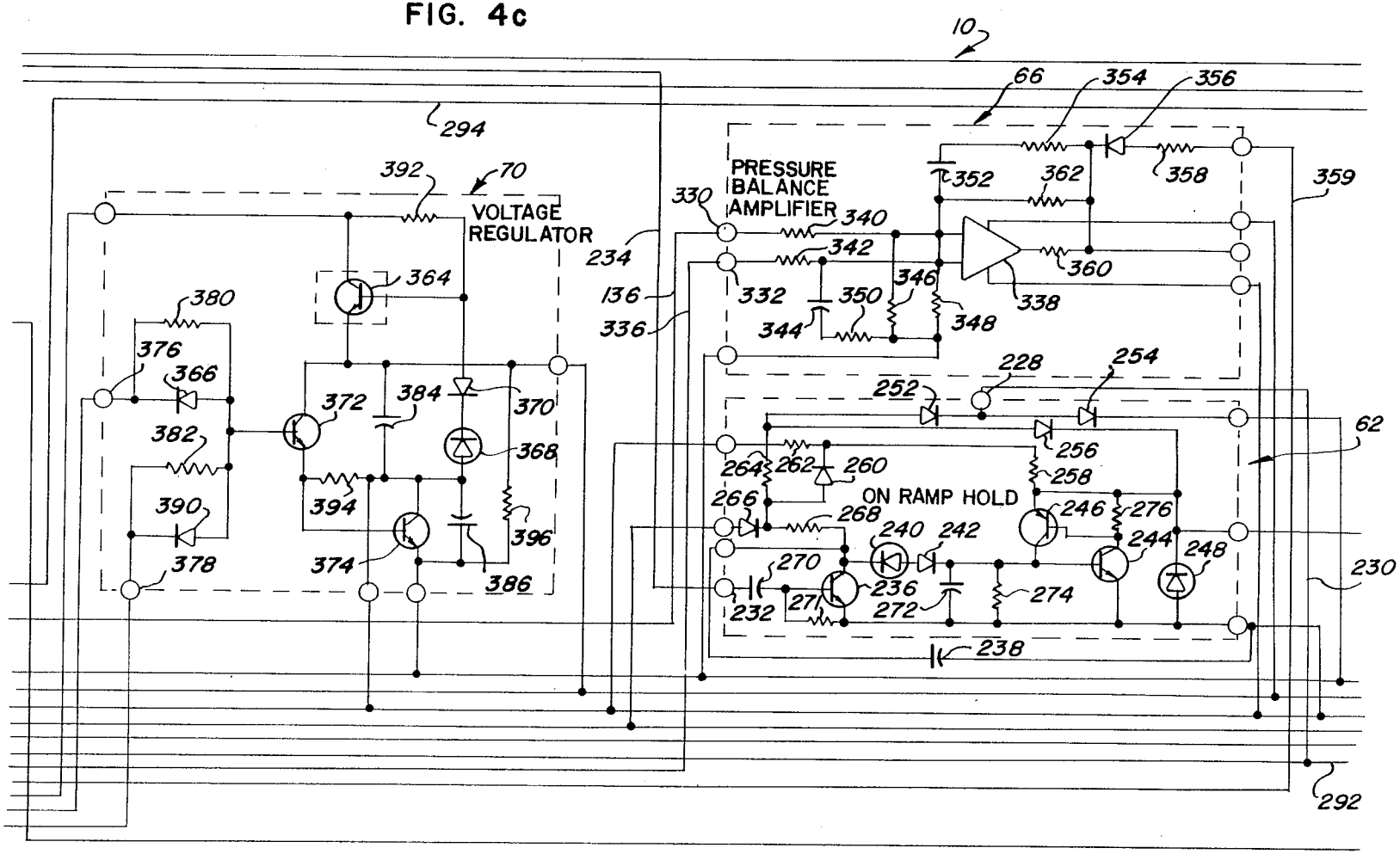
Figure 4D:
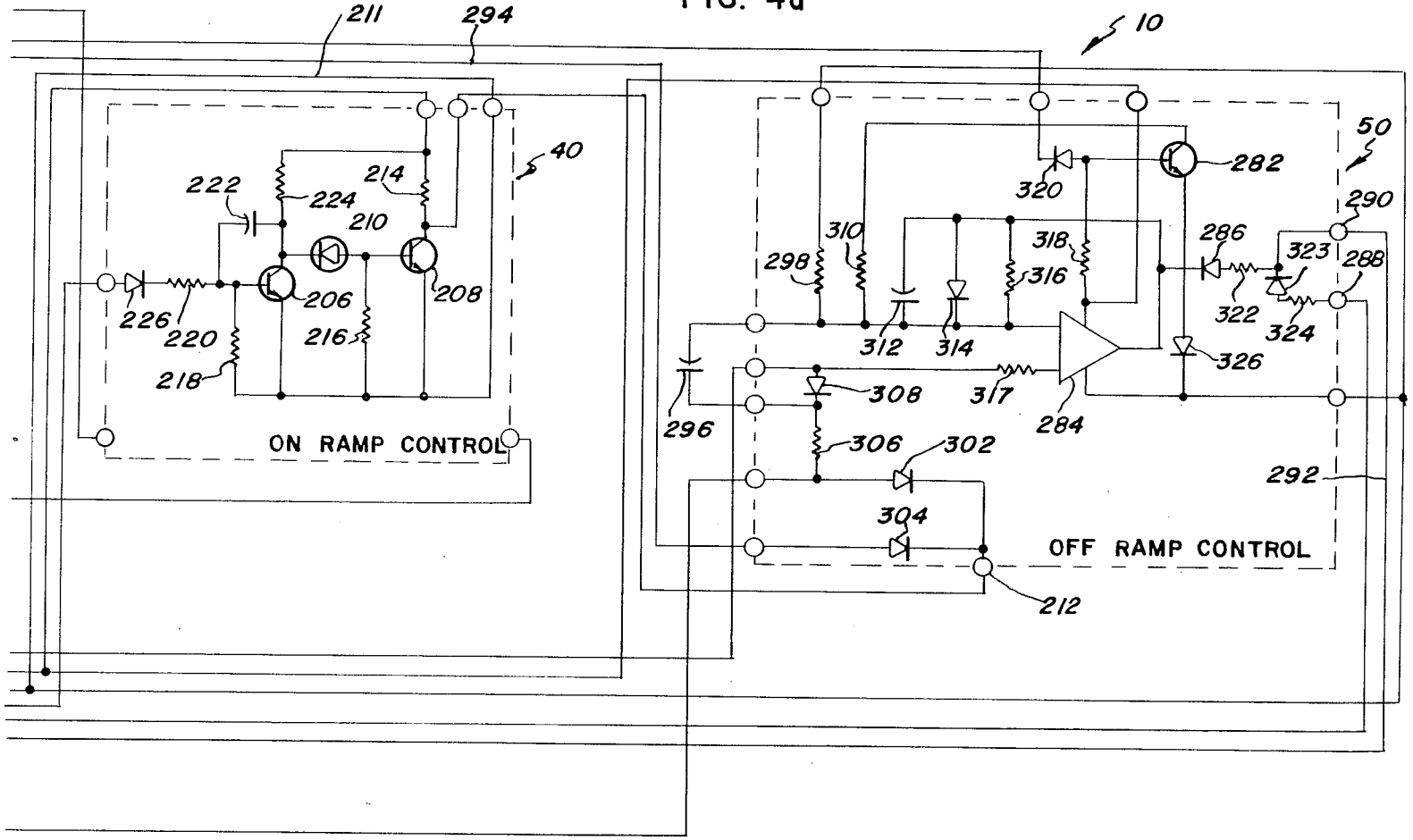

Before describing the selective deceleration control circuit 10, it will be helpful to briefly review the anti-skid control circuit referred to and disclosed in detail in the above identified Hirzel patent application. Referring to FIG. 3, the anti-skid control circuit 12 is shown in a functional block diagram. The associated circuitry for each of the functional blocks may be found in the above identified Hirzel patent application. The transducer 14 produces an output wave signal which is shaped and limited by the squaring circuit 16 into a square wave, the frequency of which is proportional to the rotational speed of the wheel to which the transducer 14 is connected. The constant amplitude square wave output of the squaring circuit 16 is transmitted to the velocity-to-DC converter 18 whose function is to convert the wheel speed frequency output of the squaring circuit 16 into a DC velocity analog voltage that varies directly with the wheel speed. This wheel speed signal is then transmitted via the lead 20 to the anti-skid control circuit 12. The anti-skid control circuit 12 comprises a deceleration reference control circuit 26, a velocity reference control circuit 28, a velocity comparator 30, a pressure bias modulator control circuit 32 (hereinafter referred to as PBM control circuit 32), and a summing amplifier and transient control circuit 34. The output from the summing amplifier and transient control circuit 34 is an anti-skid brake control signal which is transmitted via the lead 24 to a valve driver 36 to reduce brake pressure in proportion to the magnitude of the anti-skid brake control signal.

In operation, the velocity comparator 30 compares the analog wheel speed voltage from the velocity-to-DC converter 18 with an aircraft velocity reference voltage that is generated by the velocity reference circuit 28. The velocity reference circuit 28 comprises an operational integrator having an output which simulates aircraft velocity. The velocity reference circuit 28 has a network which provides a unilateral feedback 29 which forces the output of the velocity reference circuit 28 to track the wheel speed voltage to initial conditions at spin-up. During spin-up, the velocity reference circuit 28 is driven by the output of the velocity comparator 30. After the spin-up condition is reached, the velocity comparator output returns to a quiescent level which, in turn, prevents any further increase in the velocity reference voltage transmitted by the velocity reference circuit 28.

The velocity reference circuit 28 during deceleration of the aircraft is driven by the output signal from the deceleration reference control circuit 26 which also receives the analog wheel speed voltage signal from the velocity-to-DC converter 18. The deceleration reference control circuit 26 functions as a low pass differentiator and operates on the analog wheel speed voltage signal from the velocity-to-DC converter 18. The resultant output from the deceleration reference control circuit 26 in essence is a derivative of the slow changing component of the wheel speed voltage. Since the slow changing component of wheel speed is due to the aircraft deceleration, the output signal from the deceleration reference control circuit 26 is proportional to the aircraft deceleration or drag force. This output signal is transmitted to the velocity reference circuit 28 to reduce the reference velocity signal.

As previously indicated, the output signal from the velocity reference circuit 28 is transmitted to the velocity comparator 30 where it is compared to the wheel speed signal produced by the velocity-to-DC converter 18. Thus, the velocity comparator circuit 30 continuously compares wheel speed with aircraft velocity. The output of the velocity comparator circuit 109 represents an error signal indicative of wheel slip. This slip signal is used to drive the PBM control circuit 32.

The PBM control circuit 32 is the main controlling element for normal brake pressure correction. The PBM control circuit 32 functions as an operational integrator that integrates departure of the slip signal from a predetermined actuation threshold to provide a smoothly modulating anti-skid control voltage. This smoothly modulating control voltage is transmitted to the summing amplifier and transient control circuit 34. The velocity error signal from the velocity comparator circuit 30 is also transmitted to the summing amplifier and transient control circuit 4. The output signal from the PBM control circuit 32 as well as the velocity error signal are then summed and provide a composite signal to the valve driver circuit 36. The valve driver circuit 36 supplies valve drive current to the coil of a servo valve which, in turn, controls brake pressure on the wheel. The current provided is in inverse proportion to the required brake pressure reduction and thus the greater the current supplied, the more the brake pressure is relieved or relaxes on the wheels. Thus, regardless of the amount of brake pressure applied by the pilot of the aircraft, and regardless of the runway conditions, the amount of braking pressure applied to the wheels may be automatically controlled by the anti-skid control system 12 to prevent skidding of the aircraft. While the above description is necessarily brief and functional in nature, a complete description including a complete schematic diagram of one type of anti-skid control system 12 may be found in the aforementioned Hirzel U.S. patent application Ser. No. 155,903.

Again referring to FIGS. 1 and 2, the selective deceleration control circuit 10 will now be described. The selective deceleration control circuit 10 compares wheel speed with a reference velocity signal produced by a deceleration generator 40 which has a selectable rate of decrease of rundown indicative of a desired rate of deceleration of the aircraft. The difference between the wheel speed signal generated by the velocity-to-DC converter 18 and the reference velocity signal is an error signal which is processed and used to generate a control signal for transmission to the valve drivers 36 and 36a associated with the wheels being controlled. The selective deceleration control circuit 10 utilizes the same transducer 14, squaring circuit 16, and velocity-to-DC converter 18 which were utilized in the anti-skid control circuit 12. However, it will be recognized that separate circuitry may be employed, and it is not necessary to utilize circuitry common with the anti-skid control circuit 12.

Figure 2:
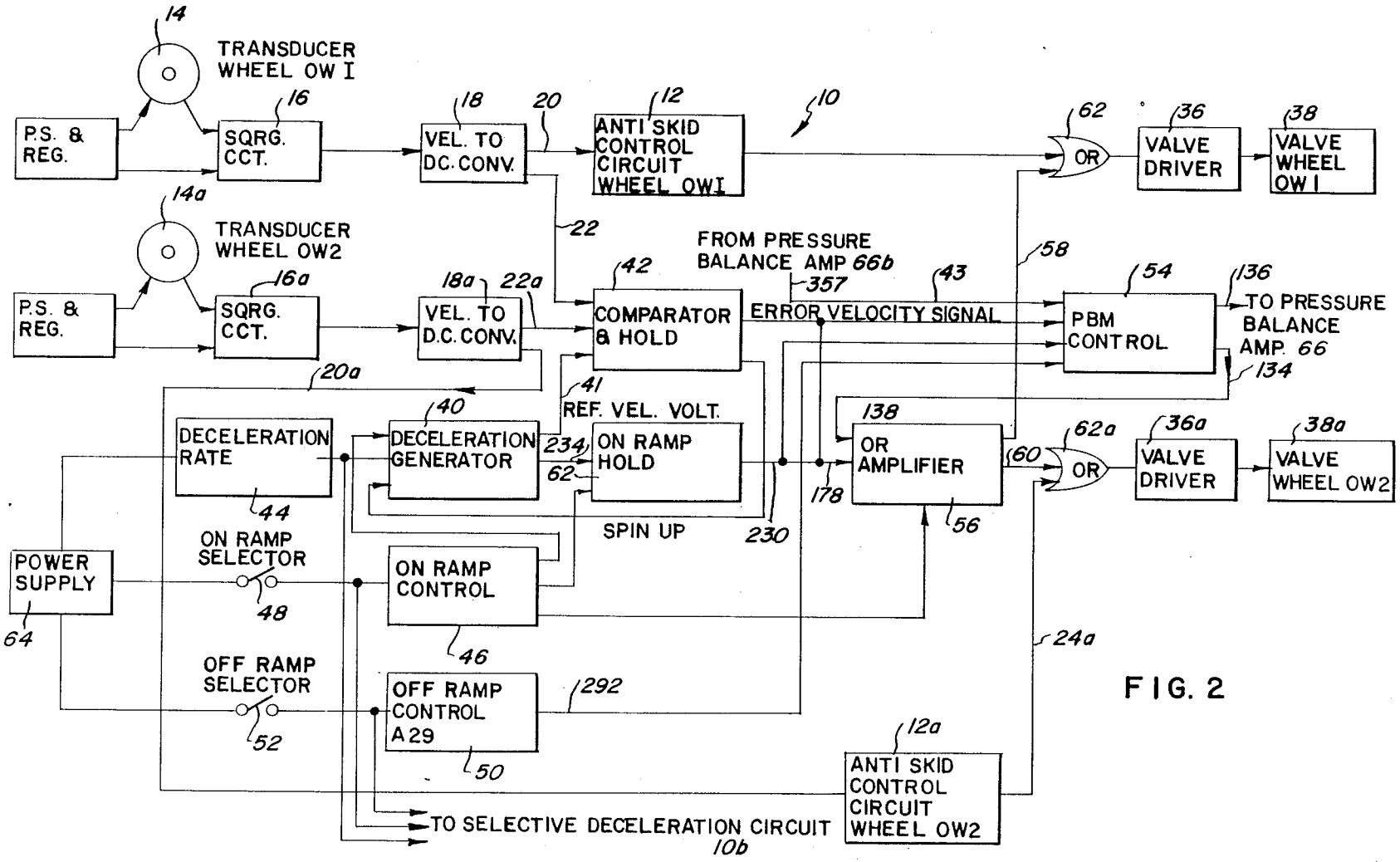
FIG. 2 is a functional block diagram of the principal units of the selective deceleration control circuit 10 from FIG. 1.

As seen in FIGS. 1 and 2, the selective deceleration control circuit 10 controls the deceleration of two wheels of the aircraft, namely outboard wheel OW1 and outboard wheel OW2. A similar deceleration control circuit 10b controls the deceleration of inboard wheels IW1 and IW2. It will be recognized that the selective deceleration control circuit 10 could be used to control more than two wheels or alternatively could be used to control a single wheel.

The selective deceleration control circuit 10 includes a comparator and hold circuit 42 which sums the wheel speed information from the velocity-to-DC converters 18 and 18a and compares their average output with the reference velocity signal generated by the deceleration generator 40.

The deceleration generator 40 generates a voltage ramp which comprises the reference velocity signal that is capable of producing a reference velocity signal having a selectively variable rate of decrease or rundown. The rate of decrease of the reference velocity signal determines the rate of deceleration of the aircraft. Any desired deceleration rate may be manually selected by the pilot through the use of a deceleration rate selector 44 which may comprise a simple potentiometer or rheostat located in the cockpit of the aircraft.

The pilot activates the selective deceleration control circuit 10 by applying an ON-ramp control voltage from an ON-ramp control circuit 46. This may be achieved by merely closing an ON-ramp selector switch 48 or by other suitable logic switching means. The selective deceleration control circuit may be disengaged by applying an OFF-ramp control voltage from an OFF-ramp control circuit 50. This is accomplished by closing the OFF-ramp selector switch 52 also located in the cockpit. The closing of the OFF-ramp selector switch 52 will immediately disengage the selective deceleration control circuit 10 and will return the braking control of the aircraft to the pilot and to the anti-skid control circuitry in a manner to be described below. The selective deceleration control circuit 10 may be disengaged by means which respond to actuation of the brake pedals by the pilot.

Upon initial spin-up of the wheels due to the initial contract of the wheels with the runway, the output of the comparator and hold circuit 42 is low. This forces the initial output of the deceleration generator 40 to rise to a voltage level equivalent to the wheel velocity transmitted from the velocity-to-DC converter 18. This initial spin-up velocity establishes the initial value for the reference velocity signal generated by the deceleration generator 40. This reference velocity signal is compared to the wheel speed by the comparator and hold circuit 42 to generate an error velocity signal which is transmitted to a pressure bias modulation control circuit 54, hereinafter referred to as PBM control circuit 54. The PBM control circuit 54 functions as an operational integrator in an identical manner to the PBM control circuit 32 associated with the anti-skid control circuit 12.

The PBM circuit 54 receives an initial full charge from the ON-ramp hold circuit, causing an initial full-brake-release output signal to be provided by the PBM circuit 54. This PBM signal begins to decrease due to capacitor discharge within the PBM control circuit 54 to cause a gradually increasing brake pressure to be applied to the wheels. When an error signal is generated by the comparator and hold circuit 42 which exceeds the PBM circuit actuation threshold, the PBM circuit output becomes a time-integral function of the error signal increasing when the error signal is above the threshold and decreasing when it drops below the threshold. Thus, the PBM control circuit 54 provides a smoothly modulating control voltage for brake pressure by providing gradual and alternating brake application and relaxation. As described below, this gradual brake application and relaxation is used to control aircraft deceleration at a rate equal to the preselected rate of deceleration chosen by the pilot and represented by the rundown ramp of the reference velocity signal generated by the deceleration generator 40.

The modulation signal from the PBM control circuit 54 drives the OR amplifier circuit 56. In addition, the error velocity signal from the comparator and hold circuit 42 is applied to the input of the OR amplifier 56 and summed with the PBM signal. The composite output signal from the OR amplifier 56, therefore, comprises a modulating PBM signal which is an integral function of the error signal plus a proportional or direct function of the error signal. The PBM signal component is the main controlling component with the component directly proportional to the error signal serving as a transient correction signal. In some applications, the component proportional to the error signal may not be necessary.

As can be seen in FIGS. 1 and 2, the output of the OR amplifier 56 consists of two isolated outputs 58 and 60. Each OR amplifier output is OR-ed with the associated output from the anti-skid control circuits 12 and 12a by an OR gate 62 and an OR gate 62a, respectively. The output of the OR gates 62 and 62a is transmitted to the valve drivers 36 and 36a, respectively, which, in turn, control the wheel valves 38 and 38a thereby controlling the brake pressure on the wheels OW1 and OW2.

The valve driver 36 is controlled by the output from either the anti-skid control circuit 12 or from the OR amplifier 56, whichever has the highest output level or value or, in other words, whichever will command the lower braking pressure to be applied to the selected wheel. For example, if the pilot selects a deceleration rate of 12 feet per second per second and the runway is extremely wet, he may be unable to develop a ground coefficient between the tire and runway sufficient to obtain a deceleration rate of 12 feet per second per second. As the tire begins to skid, the selected deceleration system will continue to operate. However, the anti-skid control circuit will provide a higher output or in other words will demand a lower brake pressure and will therefore control the operation of the valve driver 36. The system will remain in the anti-skid mode until a ground coefficient necessary to give a deceleration of 12 feet per second per second is again available, and at this time the output from the OR amplifier 56 will become greater than the output from the anti-skid control circuit 12 and will therefore control the valve driver 36.

Referring again to the ON-ramp hold circuit, it should be noted that its output is connected to the ON-ramp hold circuit 62. The initial closing by the pilot of the ON-ramp selector switch 48 connects a source of power 64 to the selective deceleration control circuit 10 and also results in an initial 300 millisecond-wide charging pulse from the ON-ramp hold circuit 62 to be applied to the input of the PBM control circuit 54 to cause an initial full brake release of all brake pressure on the wheels. Another function of the ON-ramp control circuit 46 is to gate the output of the OR amplifier 56. If the ON-ramp voltage is removed, the OR amplifier outputs on the leads 58 and 60 are removed, and control of the deceleration of the aircraft reverts to pilot manual brake control with anti-skid control back-up.

The OFF-ramp control circuit 50 provides a gradual brake release which may be initiated by the closing of the OFF-ramp selector switch 52 or other suitable logic circuitry. Immediately upon the closing of the OFF-ramp selector switch 52, a ramp voltage signal is placed on the input of the PBM control circuit 54 to effectively replace the error velocity signal as the input control to the PBM control circuit 54. This new ramp signal causes a gradual release of brake pressure to pilot-applied brake pressure level or quiescent valve level before deactuating the ON-ramp control circuit to return the control of the aircraft to manual braking with anti-skid back-up.

Corresponding ON-ramp control, ON-ramp hold, and OFF-ramp control circuits are provided in the inboard selective deceleration circuit 106 for simultaneous action under the control of the same switching logic represented by switches 48 and 52. Pressure balance amplifiers 66 and 66b are provided to function as balancing means for equalizing the brake load distribution between the two selective deceleration circuits 10 and 10b. This is accomplished by comparing the outputs from the two selective deceleration PBM control circuits 54 and 54b and forcing the control toward the higher brake pressure.

Before describing the detailed circuitry of the selective deceleration control circuit 10, it should be reiterated by reference to FIG. 1 that the selective deceleration control circuit 10 is used to control the deceleration of a first group of wheels, outboard wheels OW1 and OW2, controlled by valves 38 and 38a, and that the second selective deceleration control circuit 10b is used to control a second group of wheels, inboard wheels IW1 and IW2, controlled by wheel valves 38b and 38c. For clarity, only portions of the selective deceleration control circuit 20 are shown in FIG. 2 and in FIGS. 4a through 4d. However, it should be understood that the control circuitry for the inboard wheels is identical to the control circuitry of the outboard wheels.

It may be noted at this juncture that the selective deceleration control circuits 10 and 10b are substantially electrically separate from their associated anti-skid control circuits 12, 12a, 12b, and 12c which are fully described in the aforementioned Hirzel patent application. The only common components utilized are the transducers 14, 14a, 14b, 14c, the squaring circuits 16, 16a, 16b, 16c, the velocity-to-DC converters 18, 18a, 18b, 18c, the valve drivers 36, 36a, 36b, 36c, and the wheel valves 38, 38a, 38b, 38c. By maintaining the selective deceleration control circuits substantially electrically separate from the anti-skid control system 12, assurance is provided that a failure within the selective deceleration control circuits will not impair the anti-skid operation.

Now referring to FIGS. 4a through 4d, a complete schematic of the selective deceleration control circuit 10 will be described. The comparator and hold circuit 42 takes the wheel speed information from the two wheels in a wheel pair at its inputs 72 and 74 from the velocity-to-DC converters 18 and 18a, respectively, along the leads 22 and 22a. A reference velocity voltage or signal which is generated by the deceleration generator 40 is applied to the input 76 of the comparator and hold circuit 42 via a lead 41. This reference velocity voltage is then compared to the average of the two wheel velocity signals on the input points 72 and 74, and an error signal is produced at the output of an operational amplifier 78. The operational amplifier 78 amplifies this error velocity signal, and the output signal of the operational amplifier 78 is applied through a voltage follower amplifier 80 to the input of the PBM control circuit 54 via the lead 43. The transistor 82 is normally off except when an OFF-ramp voltage is applied in which case transistor 82 is turned on. The turning on of transistor 82 back biases a controlled rectifier 84 which then disconnects the comparator and hold circuit 42 from the PBM control input. Thus, whenever there is an off-ramp control signal generated by the pilot, the error velocity signal no longer is transmitted to the PBM control circuit 54.

As mentioned previously, the deceleration generator 40 generates a reference velocity signal having a variable rate of decrease which is indicative of the desired rate of deceleration of the aircraft. This reference velocity signal is transmitted via the lead 41 to the input of the comparator and hold circuit 42. The reference velocity signal generated by the deceleration generator 40 is a voltage ramp that is used as a measure of the *desired deceleration of the* aircraft and appears at the output 86 of the deceleration generator 40.

When wheel spin-up occurs, the output of the comparator and hold circuit 42 is initially low. This forward biases controlled rectifier 88 and charges capacitor 90 through operational amplifier 92 until the output signal (the reference velocity) is close to the wheel velocity.

When this happens, the output of the comparator and hold circuit 42 will then rise until controlled rectifier 88 is back biased, thereby preventing any further rise in this reference velocity or, in other words, in the voltage on capacitor 90. Capacitor 90 will now start to discharge at the rate determined by the voltage at input 94 of the deceleration generator 40. The voltage at the input 94 is determined by the pilot's setting of the deceleration rate selector 44. In other words, the deceleration rate selector 44 is a voltage source the output voltage of which may be selected by the pilot to set the desired deceleration rate.

To increase the accuracy of the rundown rate of the reference velocity voltage, a small precision capacitor 96 is used together with an operational amplifier 98 in a capacitance multiplier configuration. Assuming that the operational amplifiers are ideal, the capacitance *multiplier* functions as follows. If an operational amplifier is in linear region, then its inputs are at the same potential. Therefore, current through the resistor 102 is the same as the current through the resistor 104, and the current through resistor 106 is the same as the sum of the current through resistors 108 and 110. The voltage of operational amplifier 98 at output point 112 must be the same as at its inputs, and therefore the voltage drop across resistor 108 is the same as across resistor 110, and the current through resistor 110 may be computed from the following formula:

$$I_{110} = \frac{I_{total} R_{108}}{R_{108} + R_{110}}$$

but $I_{110}$ is the discharge current of capacitor 90 and therefore, multiplying $I_{total}$ by $$\frac{R_{108}}{R_{108} + R_{110}}$$

has the same effect as multiplying capacitor 90 by $$\frac{R_{108} + R_{110}}{R_{108}}$$

The PBM control circuit 54 functions to insure gradual brake reapplication after an initial brake release. Initially upon the application of an ON-ramp signal caused by the pilot closing his ON-ramp selector switch 48, a 300 millisecond-wide pulse from the ON-ramp control circuit 62 is applied to the input 126 of the PBM control circuit 54 via the lead 128. This pulse will cause a capacitor 132 to charge rapidly to the maximum PBM voltage. This maximum PBM voltage is then applied via the leads 134, 136, and 138 to the OR amplifier 56. This causes the OR amplifier to have a maximum output and will result in a maximum brake release. After this initial pulse is removed from the capacitor, the capacitor 132 will start to discharge through a resistor 140. As the capacitor discharges, the PBM voltage decreases and a gradual brake application is obtained. This is what is referred to as the ON-ramp brake application. Following this gradual ON-ramp brake application, the only input to the PBM circuit 54 during normal braking operation is from the comparator and hold circuit 42 via the lead 43 through a resistor 142. This output from the comparator and hold circuit 42 is the error velocity signal. The error velocity signal from the comparator and hold circuit 42 is integrated by the PBM control circuit 54 and more particularly by the capacitor 132 and an operational amplifier 144. Resistors 146, 148, and 150 set the actuation threshold for the integration process. A controlled rectifier 152 is a clamping diode that limits the PBM voltage when there is no input.

The OR amplifier 56 is the output circuit for the entire selective deceleration control circuit 10. The output of the OR amplifier 56 occurs at the output points 162 and 164. The signals at these output points 162 and 164 are transmitted via the leads 58 and 60 to the valve drivers 36 and 36a, respectively. As mentioned previously, the output signal from the PBM control circuit 54, which in essence is an integral function of the error velocity signal from the comparator and hold circuit 42, is applied to the OR amplifier 56 via the lead 138 through the resistors 166 and 168, and finally to operational amplifiers 170 and 172. In addition, the error velocity signal from the comparator and hold circuit 42 is applied directly to the OR amplifier 56 at input point 174 through the capacitor 176 from the output of the operational amplifier 78 of the comparator and hold circuit 42 via the lead 178. Thus, the deceleration brake control output signal of the OR amplifier circuit 56 is a composite signal comprising the deceleration control signal which is an integral function of the error velocity signal as the main control component and a direct or proportional function of the error velocity signal as a transient correcting component. As mentioned previously, the output of the OR amplifier 56 is transmitted to the valve drivers 36 and 36a through an OR gate 62 and an OR gate 62a (FIG. 1), and this signal is OR-ed with the output signal from the anti-skid control circuits 12 and 12a. If the OR amplifier output is higher than the output of the anti-skid control circuits 12 or 12a, then the OR amplifier output will control the valve driver 36 or 36a, but if the output from the anti-skid control circuit is higher, then the anti-skid control circuit signal will control the valve driver 36. This occurs because the controlled rectifiers 178 and 180 are back biased.

To assure proper operation, a zener diode 182 is provided which regulates the B plus voltage on the operational amplifiers 170 and 172 and maintains them at 18 volts in the preferred embodiment. A capacitor 185 prevents power loss transients from affecting the outputs of the OR amplifier 56. A pair of resistors 184 and 186 set the OR amplifier threshold, i.e. the PBM voltage required to cause an OR amplifier output that exceeds the valve driver threshold. The OR amplifier 56 receives its B plus voltage from the ON-ramp voltage circuit 40, and thus the ON-ramp voltage circuit 40 serves to gate the output of the OR amplifier 56. This is done so that no failure on the selective deceleration circuit 10 can cause a brake release if the ON-ramp voltage is removed.

In normal operation, when the ON-ramp voltage is applied either by the pilot closing the switch 48 or by suitable logic circuitry, the transistor 206 is on and the transistor 208 is off, thereby permitting normal operation of the OR amplifier 56. If the ON-ramp voltage is removed, then the transistor 206 will begin to turn off and when the breakdown voltage of the zener diode 210 is exceeded, the transistor 208 will then turn off. This removes the OR amplifier output from the valve driver input by grounding the point 212 of the OFF-ramp ramp circuit 50 and thereby also the outputs of the operational amplifier 170 and 172 of the OR amplifier 56. A capacitor 184 external to the OR amplifier circuit 56 introduces a delay of approximately 100 milliseconds between the time of the removal of the ON-ramp voltage and the removal of the OR amplifier output.

Immediately upon the application of an ON-ramp voltage from the ON-ramp control circuit 40, the ON-ramp hold circuit 62 generates an output pulse at the output point 228. This pulse is applied to the input of the PBM control circuit 54 via the leads 230, 130, and 128 and causes the PBM control circuit 54 to generate maximum PBM voltage thereby creating an initial brake release prior to ON-ramp brake application and prior to the generation of the error velocity signal by the comparator and hold circuit 42.

The reference velocity voltage from the deceleration generator 40 is applied to the ON-ramp hold circuit 62 at point 232 via the leads 234 and 41. Since during spin-up this voltage will change in a positive direction, the normally off transistor 236 will turn on and discharge the capacitor 238. After spin-up, the voltage at the point 232 will no longer change in a positive direction and therefore will turn off the transistor 236. The capacitor 238 will now start to charge and when its voltage exceeds the breakdown voltage of the zener diode 240 and the forward voltage of the controlled rectifier 242 and the base emitter voltage of the transistor 244, the transistor 244 will turn on. Transistors 244 and 246 are in a latching configuration so once they have turned on, they will remain on so long as the ON-ramp voltage is applied. When the transistors 244 and 246 turn on, the pulse in the PBM control circuit 54 is terminated. The time delay between the ON-ramp application and the turn on of transistors 244 and 246 is approximately 300 milliseconds. A zener diode 248 provides additional voltage regulation (transient protection). The capacitor 238 prevents the transistors 244 and 246 from unlatching during any power loss transients.

The OFF-ramp control circuit 50 functions to cause a gradual brake release after an OFF-ramp input voltage is applied due to the pilot closing the OFF-ramp selector switch 52. The OFF-ramp control circuit 50 is in a closed loop differentiator configuration. In normal braking operation when there is an ON-ramp input but no OFF-ramp input, the transistor 282 is held on. This will force the output of the operational amplifier 284 to approximately plus 4 volts and since there is no OFF-ramp input, the controlled rectifier 282 will be back biased thereby preventing the loading of the input of the PBM control circuit 54.

When the OFF-ramp is applied, the transistor 282 is turned off, and this permits normal operation of the OFF-ramp control circuit 50. The OFF-ramp voltage is now applied to the output point 288 and through the output of the point 290 to the input of the PBM control circuit 54 via the leads 292, 130, and 128. The PBM voltage will now increase at a rate proportional to the input current, and this will therefore also be the case of the output of the OR amplifier 56 thus causing a release of brake pressure. This output from the OR amplifier 56 is transmitted via lead 294 to the OFF-ramp control circuit 50 where it is differentiated by the capacitor 296 and the resistor 290 and is amplified by the operational amplifier 284. The output of the operational amplifier 284 will therefore have a voltage amplitude that is proportional to the slope of the output of the OR amplifier circuit 56. Since the output of the operational amplifier 144 of the PBM control circuit 54 will go in a negative direction from the reference, part of the input current through the resistor 150 of the PBM control circuit 54 will now be shunted from the PBM control circuit input into the operational amplifier 144. Equilibrium will therefore be established, and the rate of brake release will be constant. Controlled rectifiers 302 and 304 form a part of the gate for the OR amplifier 56. When the ON-ramp is removed, the point 212 is grounded, and this removes the OR amplifier output from the valve driver circuit 36 as described above.

As mentioned previously, the function of the pressure balance amplifiers 66 and 66b is to equalize the brake load distribution of the outboard and inboard wheel groups which are controlled by the selective deceleration circuits 10 and 10b, respectively (see FIG. 1). If this were not done, then one wheel group could carry all or most of the brake load while the other wheel group carried only a small brake load. The brake load information (the PBM voltage) from the outboard wheel group is applied to the input point 330 of the balance amplifier 66 via the leads 134 and 136. This PBM voltage is also applied to the input of the balance amplifier 66b via the leads 134 and 136b. The brake load information from the inboard wheel group is applied to the input point 332 of the balance amplifier 66 via the leads 334 and 336 and is also applied to the input of the balance amplifier 66b via the lead 336b (FIG. 1). The output from the pressure balance amplifier 66 is applied to the input of the PBM control circuit 54b via the lead 359. Similarly, the output of pressure balance amplifier 66b is applied to the input of PBM control circuit 54 via the leads 357 and 128. If the two inputs to the pressure balance amplifier 6 are approximately the same, the output of the operational amplifier 338 is less than 4 volts and will not affect the PBM control circuit 54b associated with the inboard wheels. But if the voltage at the points 330 is less than that at point 332, then the output of the operational amplifier 338 goes higher than 4 volts and will cause an increase of the PBM voltage in PBM control circuit 54b (FIG. 1) until the input at the points 330 and 332 is again in balance. It should be noted here that the PBM reference is plus 4 volts, and therefore, plus 4 volts with respect to ground out of the PBM control circuit 54 means zero PBM voltage and zero volts with respect to ground means maximum PBM voltage. A similar balancing control takes place in the pressure balance amplifier 66b (FIG. 1) which if an inbalance occurs, controls the PBM voltage in PBM control circuit 54.

As mentioned heretofore, the transistor 82 of the comparator and hold circuit 42 is off at all times except for a short time (approximately 300 milliseconds) at the beginning of the ON-ramp. Its function is to assure that there is no PBM voltage buildup due to pressure balance amplifier unbalance until the entire system has stabilized and thus the pressure balance amplifiers 66 and 66b only affect the selective deceleration control circuits 10 and 10b after stabilization.

The voltage regulator circuit 70 does not appear in FIGS. 1 and 3 and is disclosed to show one method for obtaining the various voltages needed to operate the selective deceleration control circuit 10. However, it will be recognized that several other methods may be utilized to obtain the required operating voltages. The voltage regulator circuit 70 takes the 24 volt DC input voltage and converts it to a 15 volt DC source. The voltage regulator is of the series type (emitter follower) where the voltage at the base of a path transistor 364 is determined by the voltage across the controlled rectifier 366 and the zener diode 368. Zener diode 368 is rated at 14.6 volts, and the forward voltage of the controlled rectifier 370 is 0.7 volts. Therefore, the base voltage of the transistor 364 will be approximately 15.3 volts where the voltage at the emitter (output voltage) will be approximately 14.6 volts. Transistors 372 and 374 form a voltage follower that supplies the plus 4 volt DC to the rest of the selective deceleration control circuit 10. The 4 volts from the main power source of the aircraft enter the voltage regulator circuit 70 at the points 376 and 378 and are applied to the base of the transistor 372 through the resistors 380 and 382. Since the base emitter voltage drops, the transistors 372 and 374 cancel each other, the voltage at the emitter of the transistor 374 (output voltage) will be approximately the same as the input voltage or plus 4 volts. The capacitors 384 and 386 provide additional filtering. The resistor 388 reduces the power dissipation in the transistor 364 and also provides isolation from the 24 volt input.

It will be recognized that the schematic diagrams shown in FIGS. 4a, 4b, 4c, and 4d represent one illustrative embodiment of the invention. The various circuit elements are tabulated below as to value or type number. It will be recognized, however, that these values are exemplary and are merely illustrative of the invention, and various modifications may be made without departing from the spirit and scope of the invention. All capacitor values are in microfarads except as otherwise noted. All resistor values are in ohms or kilo except as otherwise noted.

| DECELERATION GENERATOR-40 ELEMENT NUMBER | VALUE OR TYPE NUMBER |
|---|---|
| 90 | 1 μf |
| 96 | .0022 μf |
| 102 | 57.6K |
| 104 | 57.6K |
| 106 | 4.99K |
| 108 | 4.99K |
| 110 | 511K |
| 114 | 8.87K |
| 116 | 1.62K |
| 118 | 178K |
| 120 | 0.1 μf |
| 122 | 511K |
| 124 | 10K |
| 125 | 909 Ω |
| 127 | 3.74K |
| 88 | CD5645 |
| 92 | S101 |
| 98 | LM207 |

| COMPARATOR AND HOLD CIRCUIT-42 ELEMENT NUMBER | VALUE OR TYPE NUMBER |
|---|---|
| 71 | 4.7 μf |
| 73 | 2.37K |
| 75 | 13.3K |
| 77 | 150K |
| 79 | 150K |
| 83 | 301K |
| 85 | 2K |
| 87 | IN751A |
| 78 | S101 |
| 80 | S101 |
| 82 | 2N956 |

| PBM CONTROL CIRCUIT-54 ELEMENT NUMBER | VALUE OR TYPE NUMBER |
|---|---|
| 132 | 2.2 μf |
| 140 | 499K |
| 142 | 40.2K |
| 146 | 24.3K |
| 148 | 130K |
| 150 | 1K |
| 160 | 100 pF |
| 144 | 42-15570 |

-continued

| OR AMPLIFIER-56 ELEMENT NUMBER | VALUE OR TYPE NUMBER |
|---|---|
| 166 | 150K |
| 168 | 150K |
| 176 | .047 μf |
| 184 | 150K |
| 185 | 150 μf |
| 186 | 280K |
| 188 | 1K |
| 190 | 1K |
| 192 | 10K |
| 198 | 150K |
| 200 | 46.4K |
| 202 | 280K |
| 204 | 1K |
| 196 | IN649 |
| 182 | UZ818 |
| 170 | S101 |
| 172 | S101 |

| ON-RAMP CONTROL CIRCUIT-46 ELEMENT NUMBER | VALUE OR TYPE NUMBER |
|---|---|
| 214 | 20K |
| 216 | 5.11K |
| 218 | 4.53K |
| 220 | 10K |
| 222 | 2.2 μf |
| 224 | 7.5K |
| 226 | IN649 |
| 210 | IN5234 |
| 208 | 2N956 |
| 206 | 2N956 |

| ON-RAMP HOLD CIRCUIT-62 ELEMENT NUMBER | VALUE OR TYPE NUMBER |
|---|---|
| 258 | 3.32K |
| 262 | 1K |
| 264 | 10K |
| 268 | 15K |
| 270 | 6.8 μf |
| 271 | 10K |
| 272 | 6.8 |
| 274 | 2K |
| 276 | 2K |
| 252 | CD5645 |
| 266 | IN649 |
| 240 | IN5230 |
| 248 | UZ5720 |
| 236 | 2N956 |
| 246 | 2N2605 |
| 244 | 2N930 |

| OFF-RAMP CONTROL CIRCUIT-50 ELEMENT NUMBER | VALUE OR TYPE NUMBER |
|---|---|
| 296 | 22 μf |
| 298 | 49.9 |
| 206 | 2K |
| 310 | 750 |
| 312 | .68 μf |
| 316 | 383K |
| 317 | 249K |
| 318 | 68.1K |
| 322 | 1.21K |
| 324 | 200K |
| 284 | S101 |
| 282 | 2N930 |
| 286 | CD5645 |
| 323 | CD5645 |

| PRESSURE BALANCE AMPLIFIER-62 ELEMENT NUMBER | VALUE OR TYPR NUMBER |
|---|---|
| 340 | 51.1K |
| 342 | 51.1K |
| 344 | 2.2 μf |
| 346 | 10K |
| 348 | 10K |
| 350 | 200K |
| 352 | 2.2 μf |
| 354 | 200K |
| 358 | 49.9K |
| 360 | 2K |
| 362 | 1M |

-continued

| 338 | |
|---|---|
| VOLTAGE REGULATOR-70 ELEMENT NUMBER | VALUE OR TYPE NUMBER |
| 380 | 2K |
| 382 | 2K |
| 384 | 6.8 μf |
| 386 | 0.1 μf |
| 388 | 150 Ω |
| 392 | 750 Ω |
| 394 | 1.5K |
| 396 | 4.32K |
| 364 | 2N1893 |
| 372 | 2N930 |
| 374 | 2N2605 |
| 368 | 1N4058 |

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A brake control system for applying and controlling the brake application means for a wheel of a vehicle independently of operator brake application, comprising:

signal generating means for producing a wheel speed signal that is a function of the rotational speed of said wheel;

anti-skid control means for receiving and processing said wheel speed signal to provide an anti-skid brake control signal;

reference generating means for generating a reference velocity signal having a selectively variable rate of decrease;

rate selector means for manually selecting a rate of decrease of said reference velocity signal indicative of a desired rate of vehicle deceleration;

comparison means for comparing said wheel speed signal with said reference velocity signal for generating an error signal indicative of the difference between said wheel speed signal and said reference velocity signal;

control means for providing a signal to said brake application means to apply brake pressure to said wheel independently of operator brake application and response to said error signal to provide a selected deceleration control signal for controlling said brake pressure in order to maintain said desired rate of deceleration; and means for preventing said brake application means from applying said brake pressure in response to said deceleration brake control signal and for applying brake pressure in response to said anti-skid brake control signal when said anti-skid brake control signal commands a lower brake pressure than does said deceleration brake control signal.

2. The invention defined in claim 1 wherein said reference generating means includes means for establishing an initial reference velocity signal value based on the maximum value attained by said wheel speed signal during wheel spin-up.

3. The invention defined in claim 1 wherein said brake control system further comprises a deceleration control turn-on means for energizing said deceleration control signal generating means and causing said deceleration control means to provide an initial deceleration control signal of maximum, value commanding a full brake release followed by a gradual decrease from said maximum value to permit a corresponding gradual increase in brake pressure.

4. The invention defined in claim 1 wherein said brake control system further comprises means for deactuating said deceleration control signal generating means and for causing said deceleration control signal generating means to provide incident to said de-actuation a deceleration control signal of gradually decreasing value to permit a gradual decrease in brake pressure.

5. The invention of claim 1 wherein said control means provides said signal initially upon the actuation of a switch means by the operator.

6. A brake control system for applying and controlling the brake application means associated with each wheel of a pair of brake loaded-bearing wheels of an aircraft independently of operator brake application, comprising:

signal generating means for each of said wheels for producing a wheel speed signal that is a function of the rotational speed of its associated wheel;

anti-skid control means for each of said wheels for receiving and processing said wheel speed signal to provide an anti-skid brake control [for control] signal *for control* of its associated wheel;

reference generating means for generating a reference velocity signal having [a] selectively variable rate of decrease;

rate selector means for manually selecting a rate of decrease of said reference velocity signal indicative of a desired rate of vehicle deceleration;

averaging means responsive to the wheel speed signal associated with each of said wheels to form an average wheel speed signal therefrom;

comparison means for comparing said average wheel speed signal with said reference velocity signal for generating an error signal indicative of the difference between said average wheel speed signal and said reference velocity signal;

control means for providing a signal to said brake application means to apply brake pressure to each of said wheels independently of operator brake application and responsive to said error signal to provide a selected deceleration control signal for controlling said brake pressure in order to maintain said desired rate of deceleration; and means for preventing said brake application means from applying said brake pressure in response to said brake control signal and for applying brake pressure in response to said anti-skid brake control signal when said anti-skid brake control signal commands a lower brake pressure than does said deceleration brake control signal.

7. The invention defined in claim 6 wherein said reference generating means includes means for establishing an initial reference velocity signal value based on the maximum value attained by said wheel speed signal during wheel spin-up.

8. The invention defined in claim 6 wherein said brake control system further comprises a deceleration control turn-on means for energizing said deceleration control signal generating means and causing said deceleration control means to provide an initial deceleration control signal of maximum value commanding a full brake release followed by a gradual decrease from said maximum value to permit a corresponding gradual increase in brake pressure.

9. The invention defined in claim 6 wherein said brake control system further comprises means for deactuating said deceleration control signal generating means and for causing said deceleration control signal generating means to provide incident to said de-actuation a deceleration control signal of gradually decreasing value to permit a gradual decrease in brake pressure.

10. The invention defined in claim 6 wherein said deceleration brake control signal comprises a time integral function of said error signal.

11. The invention defined in claim 10 wherein said deceleration control means includes circuit means having a predetermined actuation threshold level and wherein said time integral function is a time integral function of both positive and negative variation of said error signal from said threshold level.

12. The invention defined in claim 11 wherein said deceleration brake control signal further comprises a nonintegral, proportional function of said error signal.

13. A brake control system, for an aircraft having [plural groups of braked load-bearing wheels for applying and controlling a brake application means for said wheels independently of operator brake application, said system] *separate inboard and outboard wheel groups in which the wheels in each group are symmetrically mounted on opposite sides of the aircraft*, comprising:

*brake application means for providing brake pressure to each wheel;* anti-skid control means for providing an anti-skid brake control signal;

signal generating means associated with each of said wheels for producing a first signal that is [related] *proportional* to the rotational speed of its associated wheel;

reference generating means for generating a *velocity* reference signal *having a selectively variable rate of decrease;* rate selector means for manually [selecting said] *modifying said reference generating means for producing a* reference signal indicative of [a] *the* desired [rate of] vehicle deceleration;

*separate* averaging means [in] *for* each of said wheel groups responsive to the first signal associated with each of said wheels in said group [to form an average] *for continuously determining the average speed of said wheels in each said group and for forming an analog* signal [therefrom] *which is a function of said average speed of said wheels;* comparison means for each of said wheel groups for comparing said [average] *analog* signals for the associated wheel group with said reference signal for generating an error signal indicative of the difference between said [average] *analog* signal for the associated wheel group and said reference signal;

*modulating means for each of said wheel groups responsive to said error signal for producing a modulating brake signal when said error signal exceeds a predetermined threshold level, said modulating brake signal including a time integral function of both positive and negative variations of said error signal from said threshold level;* control means associated with each group of wheels *and responsive to said modulating brake signal* for providing a *deceleration brake control* signal to said brake application means [to apply brake pressure to said wheels] independently of operator brake application and [responsive to said error signal to provide a deceleration control signal] for controlling said brake pressure in order to maintain said desired rate of deceleration, *said control means including pressure balancing means associated with each of said modulating means for comparing the modulating brake signal of said associated modulating means with the modulating brake signal of another modulating means and causing the other modulating means to produce a modulating brake signal whose valve is not less than that of the associated modulating brake signal, thereby equalizing brake load distribution between said wheel groups;* [and]

means for preventing said brake application means from applying said brake pressure in response to said deceleration brake control signal for said group of wheels and for applying brake pressure in response to said anti-skid brake control signal when said anti-skid brake control signal commands a lower brake pressure than does said deceleration brake control signal;

*means for submitting an on-ramp signal to said modulating means to cause said modulating means to provide an initial deceleration brake control signal to gradually increase brake pressure; and*

*means for submitting an off-ramp signal to said modulating means to cause said modulating means to provide a final deceleration brake control signal to gradually remove brake pressure.*

[14. The invention defined in claim 13 further comprising: a means associated with each of said control means for comparing the output thereof with the output of another of said control means associated with another wheel group to cause the output of the associated control means to command a brake pressure level not less than that commanded by said other control means.]

15. The [invention] *brake control system* of claim 13 [where in] *wherein* each of said control means provides said *deceleration brake control* signal initially upon the actuation of a switch means by the operator.

16. A deceleration control system for [applying and controlling the brake application means associated with each wheel of group of braked load-bearing wheels of] an aircraft, [independently of operator brake application,] comprising:

*inboard and outboard wheels, each wheel having a brake;*

*separate brake application means for providing brake pressure to said wheels;*

*separate inboard and outboard wheel groups in which the wheels in each of said groups are mounted on opposite sides of the aircraft;* signal generating means for each of said wheels for producing a first signal that is [related] *proportional* to the rotational speed of its associated wheel;

reference generating means for generating a *velocity* reference signal *having a selectively variable rate of decrease;* rate selector means for manually [selecting said] *modifying said reference generating means for producing a* reference signal indicative of [a] *the* desired [rate of] vehicle deceleration;

*separate* averaging means *for each of said wheel groups* responsive to the first signal associated with each of said wheels [to form an] *for continuously determining the* average *speed of said wheels and for form-*

*ing an analog* signal [therefrom] *which is a function of said average speed of said wheels;* comparison means for comparing said [average] *analog* signal with said reference signal for generating an error signal indicative of the difference between said [average] *analog* signal and said reference signal; and

*modulating means responsive to said error signal for producing a modulating brake signal when said error signal exceeds a predetermined threshold level, said modulating brake signal including a time integral function of both positive and negative variations of said error signal from said threshold level;* control means *responsive to said modulating brake signal* for providing a *deceleration brake control* signal to said brake application means [to apply brake pressure to said wheels] independently of operator brake application and [responsive to said error signal to provide a selected deceleration control signal] for controlling said brake pressure in order to maintain said desired rate of deceleration, *said control means including separate pressure balancing means associated with each of said modulating means for comparing the modulating brake signal produced thereby with the modulating brake signal produced by another of said modulating means and producing an output that is applied to said other modulating means to command a deceleration brake control signal whose value is not less than the deceleration brake control signal commanded by said associated modulating means, thereby causing the braking load to be evenly distributed between wheel groups;*

*means for submitting an on-ramp signal to said modulating means to cause said modulating means to provide an initial deceleration brake control signal to gradually increase brake pressure; and*

*means for submitting an off-ramp signal to said modulating means to cause said modulating means to provide a final deceleration brake control signal to gradually remove brake pressure.*

17. The [invention] *deceleration control system* defined in claim 16 wherein [each of] said reference generating means includes means for establishing an initial reference signal value based on the maximum value attained by said average signal during wheel spin-up.

18. The [invention] *deceleration control system* defined in claim [11] *16* wherein said [brake control system further comprises a control turn-on means for energizing said control means and causing said control] *means for submitting an on-ramp signal includes* means [to provide] *for providing* an initial deceleration *brake* control signal of maximum value commanding a full brake release followed by a gradual decrease from said maximum value to permit a corresponding gradual increase in brake pressure.

[19. The invention defined in claim 16 wherein said brake control system further comprises means for deactuating said control means and for causing said control means to provide incident to said deactuation a deceleration control signal of gradually decreasing value to permit a gradual decrease in brake pressure.]

20. The [invention] *deceleration control system* defined in claim 16 wherein said deceleration brake control signal comprises a time integral function of said error signal.

21. The [invention] *deceleration control system* defined in claim 20 wherein said [control means includes circuit means having a predetermined actuation threshold level and wherein said] time integral function is a time integral function of both positive and negative variation of said error signal from said threshold level.

22. The [invention] *deceleration control system* defined in claim 21 wherein said deceleration brake control signal further comprises a [nonintegral] *non-integral,* proportional function of said error signal.

23. The [invention] *deceleration control system* of claim 16 wherein said control means provides said signal initially upon the actuation of a switch means by the operator.

24. A deceleration control system for an aircraft having [plural groups of brake load-bearing wheels,] *separate inboard and outboard wheel groups in which the wheels in each said group are symmetrically mounted on opposite side of the aircraft,* [for applying and controlling a brake application means for said wheels independently of operator brake application, said system] comprising:

*brake application means for applying brake pressure to said wheels;* signal generating means associated with each of said wheels for producing a first signal that is [related] *proportional* to the rotational speed of its associated wheel;

reference generating means for generating a *velocity* reference signal *having a selectively variable rate of decrease;* rate selector means for manually [selecting said] *modifying said reference generating means for producing a* reference signal indicative of [a] *the* desired [rate of] vehicle deceleration;

*separate* averaging means for each of said wheel groups responsive to the first signal associated with each of said wheels in said group [to form an] *for continuously determining the* average *speed of said wheels and for forming an analog* signal [therefrom] *which is a function of said average speed of said wheels;* comparison means for each of said wheel groups for comparing said [average] *analog* signal for the associated wheel group with said reference signal for generating an error signal indicative of the difference between said [average] analog signal for the associated wheel group and said reference signal; [and]

*modulating means for each of said wheel groups, each responsive to said error signal for producing a modulating brake signal when said error signal exceeds a predetermined threshold level, each of said modulating brake signals including a time integral function of both positive and negative variations of said error signal from said threshold level;* control means associated with each *wheel* group [of wheels] *and responsive to said modulating brake signal* for providing a *deceleration brake control* signal to said brake application means [to apply brake pressure to said wheels] independently of operator brake application and [responsive to said error signal to provide a deceleration control signal] for controlling said brake pressure in order to maintain said desired rate of deceleration, *said control means including pressure balancing means associated with each of said modulating means for comparing the modulating brake signal of said associated modulating means with the modulating brake signal of another modulating means and causing the other*

*modulating means to produce a modulating brake signal whose value is not less than that of the associated modulating brake signal, thereby equalizing brake load distribution between wheel groups;*

*means for submitting an on-ramp signal to said modulating means to cause said modulating means to provide an initial deceleration brake control signal to gradually increase brake pressure; and*

*means for submitting an off-ramp signal to said modulating means to cause said modulating means to provide a final deceleration brake control signal to gradually remove brake pressure.*

25. The [invention] *deceleration control system* defined in claim 24 wherein [each of] said reference generating means includes means for establishing an initial reference signal value based on the maximum value attained by said average signal during wheel spin-up.

26. The [invention] *deceleration control system* defined in claim 24 wherein said [brake control system further comprises for each of said wheel groups a control turn-on means for energizing said control means associated therewith and causing said associated control] *means for submitting said on-ramp signal includes* means [to provide] *for providing* an initial *brake* deceleration control signal of maximum value commanding a full brake release followed by a gradual decrease from said maximum value to permit a corresponding gradual increase in brake pressure.

[27. The invention defined in claim 24 wherein said brake control system further comprises for each of said wheel groups means for deactuating said control means associated therewith and for causing said associated control means incident to said deactuation to provide a deceleration control signal of gradually decreasing value to permit a gradual decrease in brake pressure.]

28. The [invention] *deceleration control system* defined in claim 24 wherein each [said] deceleration brake control signal comprises a time integral function of said error signal.

29. The [invention] *deceleration control system* defined in claim 28 wherein [each said control means includes circuit means having a predetermined actuation threshold level and wherein] said time integral function is a time integral function of both positive and negative variation of said error signal from said threshold level.

30. The [invention] *deceleration control system* defined in claim 29 wherein [each] said deceleration brake control signal further comprises a non-integral, proportional function of said error signal.

[31. The invention defined in claim 30 further comprising:

a means associated with each of said control means for comparing the time integral function formed thereby with the time integral function formed by another of said control means associated with another wheel group to cause the time integral function formed by said associated control means to command a brake pressure level not less than that commanded by said other control means.]

32. A brake control system for controlling the brake application means for a wheel of a vehicle comprising:

analog signal generating means for producing a wheel speed signal that is a function of the rotational speed of said wheel;

anti-skid control means for receiving and processing said wheel speed signal to provide an anti-skid brake control signal;

reference generating means for generating a reference velocity signal having a selectively variable rate of decrease;

rate selector means for manually selecting a rate of decrease of said reference velocity signal indicative of a desired rate of wheel deceleration;

comparison means for comparing said wheel speed signal with said reference velocity signal for generating an error signal indicative of the difference between said wheel speed signal and said reference velocity signal;

deceleration control signal generating means responsive to said error signal to provide deceleration brake control signal;

gate means for receiving and comparing said anti-skid brake control signal and said deceleration brake control signal to transmit for control of said brake application means the control signal which commands the lower brake pressure; and means for deactuating said deceleration control signal generating means and for causing said deceleration control signal generating means to provide incident to said deactuation a deceleration control signal of gradually decreasing value to permit a gradual decrease in brake pressure.

33. A brake control system for controlling the brake application means associated with each wheel of a pair of braked load-bearing wheels of an aircraft comprising:

analog signal generating means for each of said wheels for producing a wheel speed signal that is a function of the rotational speed of its associated wheel;

anti-skid control means for each of said wheels for receiving and processing said wheel speed signal to provide an anti-skid brake control signal for control of its associated wheel;

reference generating means for generating a reference velocity signal having a selectively variable rate of decrease;

rate selector means for manually selecting a rate of decrease of said reference velocity signal indicative of a desired rate of wheel deceleration;

averaging means responsive to the wheel speed signal associated with each of said wheels to form an average wheel speed signal therefrom;

comparison means for comparing said average wheel speed signal with said reference velocity signal for generating an error signal indicative of the difference between said average wheel speed signal and said reference velocity signal;

deceleration control signal generating means responsive to said error signal to provide a deceleration brake control signal;

gate means for each of said wheels for receiving and comparing said anti-skid brake control signal for its associated wheel and said deceleration brake control signal to transmit for control of the brake application means for its associated wheel the control signal which commands the lower brake pressure; and means for deactuating said deceleration control signal generating means and for causing said deceleration control signal generating means to provide incident to said deactuation a deceleration control signal of gradually decreasing value to permit a gradual decrease in brake pressure.

34. A brake control system for an aircraft having plural groups of braked load-bearing wheels, said system comprising:

analog signal generating means associated with each of said wheels for producing a wheel speed signal that is a function of the rotational speed of its associated wheel;

anti-skid control means for each of said wheels receiving and processing said wheel speed signal to provide an anti-skid brake control signal for control of its associated wheel;

reference generating means for generating a reference velocity signal having a selectively variable rate of decrease;

rate selector means for manually selecting a rate of decrease of said reference velocity signal indicative of a desired rate of deceleration;

averaging means for each of said wheel groups for each of the wheels in its associated wheel group to form an average wheel speed signal therefrom;

comparison means for each of said wheel groups for comparing said wheel speed signal for the associated wheel group with said reference velocity signal for generating an error signal indicative of the difference between said average wheel speed signal for the associated wheel group and said reference velocity signal;

deceleration control signal generating means for each of said wheel groups responsive to said error signal for the associated wheel group to provide a deceleration brake control signal for the associated wheel group;

gate means for each of said wheels for receiving and comparing said anti-skid brake control signal for said wheel and said deceleration brake control signal for the associated wheel group to transmit for control of brake application means associated with said wheel the control signal which commands the lower brake pressure; and a pressure balance means associated with each of said deceleration control signal generating means for comparing an output thereof with an output of another deceleration control signal generating means for another wheel group to cause the output of the associated deceleration control signal generating means to command a brake pressure level not less than that commanded by said other deceleration control signal generating means.

35. A decelerational control system controlling the brake application means for a wheel of a vehicle comprising:

analog signal generating means for producing a wheel speed signal that is a function of the rotational speed of said wheel;

reference generating means for generating a reference velocity signal having a selectively variable rate of decrease;

rate selector means for manually selecting a rate of decrease of said reference velocity signal indicative of a desired rate of deceleration; p1 comparison means for comparing said wheel speed signal with said reference velocity signal for generating an error signal indicative of the difference between said wheel speed signal and said reference velocity signal;

control means responsive to said error signal to provide a selected deceleration brake control signal; and means for deactuating said deceleration control signal generating means and for causing said deceleration control signal generating means incident to said deactuation to provide a deceleration control signal of gradually decreasing value to permit a gradual decrease in brake pressure.

36. A deceleration control system controlling the brake application means associated with each wheel of group of braked load-bearing wheels of an aircraft comprising:

analog signal generating means for each of said wheels for producing a wheel speed signal that is a function of the rotational speed of its associated wheel;

reference generating means for generating a reference velocity signal having a selectively variable rate of decrease;

rate selector means for manually selecting a rate of decrease of said reference velocity signal indicative of a desired rate of deceleration;

averaging means responsive to the wheel speed signal associated with each of said wheels to form an average wheel speed signal therefrom;

comparison means for comparing said average wheel speed signal with said reference velocity signal for generating an error signal indicative of the difference between said average wheel speed signal and said reference velocity signal;

deceleration control signal generating means responsive to said error signal to provide a deceleration brake control signal; and means for deactuating said deceleration control signal generating means and for causing said deceleration control signal generating means to provide incident to said deactuation a deceleration control signal of gradually decreasing value to permit a gradual decrease in brake pressure.

37. A deceleration control system for an aircraft having plural groups of braked load-bearing wheels, said system comprising:

analog signal generating means associated with each of said wheels for producing a wheel speed signal that is a function of the rotational speed of its associated wheel;

reference generating means for generating a reference velocity signal having a selectively variable rate of decrease;

rate selector means for manually selecting a rate of decrease of said reference velocity signal indicative of a desired rate of deceleration;

averaging means for each of said wheel groups for each of the wheels in its associated wheel group to form an average wheel speed signal therefrom;

comparison means for each of said wheel groups for comparing said wheel speed signal for the associated wheel group with said reference velocity signal for generating an error signal indicative of the difference between said average wheel speed signal for the associated wheel group and said reference velocity signal;

deceleration control signal generating means for each of said wheel groups responsive to said error signal for the associated wheel group to provide a deceleration brake control signal for the associated wheel group; and means for each of said wheel groups for deactuating said deceleration control signal generating means associated therewith and for causing said associated deceleration control signal generating means incident to said deactuation to provide a deceleration control signal of gradually decreasing value to permit a gradual decrease in brake pressure.

38. A deceleration control system for an aircraft having plural groups of braked load-bearing wheels, said system comprising:

analog signal generating means associated with each of said wheels for producing a wheel speed signal that is a function of the rotational speed of its associated wheel;

reference generating means for generating a reference velocity signal having a selectively variable rate of decrease;

rate selector means for manually selecting a rate of decrease of said reference velocity signal indicative of a desired rate of deceleration;

averaging means for each of said wheel groups for each of the wheels in its associated wheel group to form an average wheel speed signal therefrom;

comparison means for each of said wheel groups for comparing said wheel speed signal for the associated wheel group with said reference velocity signal for generating an error signal indicative of the difference between said average wheel speed signal for the associated wheel group and said reference velocity signal;

deceleration control signal generating means for each of said wheel groups responsive to said error signal for the associated wheel group to provide a deceleration brake control signal for the associated wheel group; and a pressure balance means associated with each of said deceleration control signal generating means for comparing the signal formed thereby with the signal formed by another deceleration control signal generating means for another wheel group to cause the signal formed by said associated deceleration control signal generating means of the associated deceleration control signal generating means to command a brake pressure level not less than that commanded by said other deceleration control signal generating means.

39. A brake control system for applying and controlling a brake application means for a wheel of a vehicle independently of operator brake application comprising:

signal generating means for producing a first signal that is proportional to the speed of said wheel;

reference generating means for generating a velocity reference signal having a selectively variable rate of decrease;

rate selector means for manually selecting a rate of decrease of said reference velocity signal indicative of a desired rate of vehicle deceleration;

comparison means for comparing said first signal with said reference signal for generating an error signal indicative of the difference between said first signal and said reference signal; and control means for providing a signal to said brake application means to apply brake pressure to said wheel independently of operator brake application and responsive to said error signal to provide a selected deceleration brake control signal for controlling said brake pressure in order to maintain said desired rate of deceleration.

40. The invention defined in claim 39 wherein said deceleration brake control signal comprises a time integral function of said error signal.

41. The invention defined in claim 40 wherein said deceleration control means includes circuit means having a predetermined actuation threshold level and wherein said time integral function is a time integral function of both positive and negative variation of said error signal from said threshold level.

42. The invention defined in claim 40 wherein said deceleration brake control signal further comprises a non-integral, proportional function of said error signal.

43. The invention defined in claim 39 wherein said deceleration control system further comprises a deceleration control turn-on means for energizing said control means and causing said control means to provide an initial deceleration control signal of maximum value commanding a full brake release followed by a gradual decrease from said maximum value to permit a corresponding gradual increase in brake pressure.

44. The invention defined in claim 39 wherein said deceleration control system further comprises means for deactuating said control means and for causing said control means incident to said deactuation to provide a deceleration control signal of gradually decreasing value to permit a gradual decrease in brake pressure.

45. The invention defined in claim 39 wherein said deceleration brake control signal comprises a time integral function of said error signal.

46. The invention defined in claim 45 wherein said control means includes circuit means having a predetermined actuation threshold level and wherein said time integral function is a time integral function of both positive and negative variation of said error signal from said threshold level.

47. The invention defined in claim 45 wherein said deceleration brake control signal further comprises a nonintegral, proportional function of said error signal.

48. The invention of claim 39 wherein said control means provides said signal initially upon the actuation of a switch means by the operator.

* * * * *